United States Patent
Mahnkopf

(10) Patent No.: US 9,604,618 B2
(45) Date of Patent: Mar. 28, 2017

(54) BRAKE BOOSTER AND METHOD FOR ITS OPERATION

(75) Inventor: Dirk Mahnkopf, Eglosheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 552 days.

(21) Appl. No.: 13/698,966

(22) PCT Filed: Mar. 25, 2011

(86) PCT No.: PCT/EP2011/054593
§ 371 (c)(1),
(2), (4) Date: Feb. 6, 2013

(87) PCT Pub. No.: WO2011/144378
PCT Pub. Date: Nov. 24, 2011

(65) Prior Publication Data
US 2013/0140877 A1    Jun. 6, 2013

(30) Foreign Application Priority Data

May 20, 2010 (DE) .......... 10 2010 029 160
Aug. 4, 2010 (DE) .......... 10 2010 038 918

(51) Int. Cl.
*B60T 8/64* (2006.01)
*B60T 13/14* (2006.01)
(Continued)

(52) U.S. Cl.
CPC .............. *B60T 13/148* (2013.01); *B60T 1/10* (2013.01); *B60T 8/3265* (2013.01); *B60T 13/585* (2013.01); *B60T 13/66* (2013.01); *B60W 10/08* (2013.01); *B60W 10/188* (2013.01); *B60W 30/18127* (2013.01)

(58) Field of Classification Search
CPC ... B60T 2220/06; B60T 13/585; B60T 13/586
See application file for complete search history.

(56) References Cited

U.S. PATENT DOCUMENTS 4,610,483 A * 9/1986 Matsumoto et al. .......... 303/192
5,609,399 A * 3/1997 Feigel et al. ............... 303/113.4
(Continued)

FOREIGN PATENT DOCUMENTS

DE    102009007494    9/2009
DE    102010001037    10/2010
(Continued)

OTHER PUBLICATIONS

International Search Report for PCT/EP2011/054593 dated Jun. 6, 2011.

*Primary Examiner* — Nicholas J Lane
(74) *Attorney, Agent, or Firm* — Gerard Messina

(57) ABSTRACT

A regulatable brake booster and to a method and a control unit for operating same. Using the method for operating the brake booster, as well as the embodiment of the brake booster, a reaction on a driver may be avoided or reduced by an offset of the brake pedal or by a changed operating force in response to a change in the supporting force. The change in the supporting force is particularly an adjustment of the braking effect of an hydraulic braking system to the braking effect of a regenerative braking system.

23 Claims, 3 Drawing Sheets

(51) Int. Cl.
*B60T 1/10* (2006.01)
*B60T 8/32* (2006.01)
*B60T 13/58* (2006.01)
*B60T 13/66* (2006.01)
*B60W 10/08* (2006.01)
*B60W 10/188* (2012.01)
*B60W 30/18* (2012.01)

(56) References Cited

U.S. PATENT DOCUMENTS

| | | | |
|---|---|---|---|
| 2002/0096936 A1* | 7/2002 | Ishida et al. | 303/114.1 |
| 2002/0158510 A1* | 10/2002 | Kobayashi et al. | 303/155 |
| 2004/0189088 A1* | 9/2004 | Bacardit et al. | 303/114.3 |
| 2005/0023891 A1 | 2/2005 | Terazawa et al. | |
| 2006/0055236 A1* | 3/2006 | Berthomieu et al. | 303/114.3 |
| 2006/0163938 A1* | 7/2006 | Maligne et al. | 303/114.3 |
| 2009/0115242 A1 | 5/2009 | Ohtani et al. | |

FOREIGN PATENT DOCUMENTS

| | | |
|---|---|---|
| FR | 2 933 936 | 1/2010 |
| JP | 2001-171497 | 6/2001 |
| JP | 2002-321611 | 11/2002 |
| JP | 2003-175816 | 6/2003 |
| JP | 2005-53302 | 3/2005 |
| JP | 2006-285306 | 10/2006 |

* cited by examiner

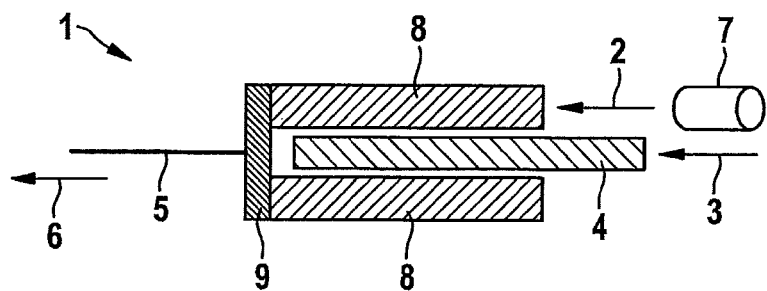
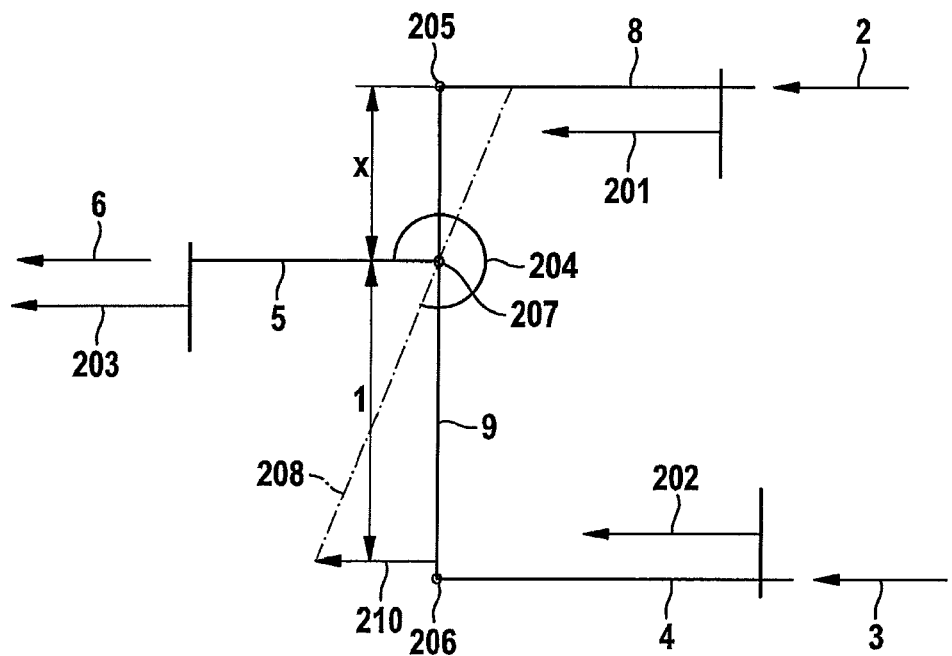

BRAKE BOOSTER AND METHOD FOR ITS OPERATION

FIELD OF THE INVENTION

The present invention relates to a braking system which includes two partial braking systems. One of these is a hydraulic partial braking system, which also includes brake booster 2, and the other partial braking system is a regenerative partial braking system. The braking effect of the two partial braking systems leads to an overall braking effect of the braking system. If the proportion of the braking effect of the regenerative braking system of the overall braking effect changes, the hydraulic braking effect has to be adjusted to this change, and at best, compensate for this change.

BACKGROUND INFORMATION

Adjusting the hydraulic braking effect of the hydraulic partial braking system, in this context, should take place, in the optimal case, unnoticed by the driver, particularly without a reaction for the driver, based on a changing feel of the brake pedal, an offset of the brake pedal or a change in the force to be exerted in its operation. For this reason, in such overall braking systems there is frequently provided a complete decoupling of the operating unit, that is, the brake pedal, for example, from the hydraulic braking system; the driver operates only a pedal simulator, in this context. A force transmission from the driver to the wheel brakes is frequently not provided in such systems, or is interrupted by closing a valve, for example, which connects the main brake cylinder hydraulically to a wheel brake. This may, however, influence the safety of the braking system, particularly in the case of the failure of a brake force-generating arrangement.

German document DE 10 2009 007 494 A1 discusses a braking system, in which, as mentioned above, the driver is separated in the case of a generatorical braking of the brake circuit.

SUMMARY OF THE INVENTION

The method according to the present invention enables adjusting the braking effect by the adequate operation of a controllable brake booster, so that the driver senses no reaction, or only a slight one, the driver not being decoupled from the braking system. In the braking system according to the present invention, the driver always remains connected to the at least one brake circuit that is connected to the main brake cylinder. Connected means, in this sense, that the possibility of a force transmission is maintained, independently of whether the driver is braking conventionally and/or regeneratively.

The present invention is concerned with a regulatable brake booster and a method for operating it.

In methods according to the present invention of the regulatable brake booster it is provided that the brake booster be a part of the hydraulic braking system. The brake booster applies a supporting force to an output element of the brake booster. The supporting force to be applied is established as a function of at least one information with regard to at least one elastic element, which is located between an input element of the brake booster and the output element, and as a function of at least one information with regard to a pressure-volume relationship of the hydraulic braking system, particularly a p-V characteristics curve. In addition, the supporting force to be applied is also established as a function of an input force applied by the driver, which is applied to the input element. In the method according to the present invention, the supporting force to be applied is applied by the brake booster.

The relationship between the input force applied by the driver, for instance, via a brake pedal, and the supporting force applied by the booster is also designated as the characteristic of the brake booster. In the case of a brake booster that is able to be regulated, this relationship may be varied. Because the supporting force is able to be regulated or set independently of the input force, this characteristic is able to be changed in the case of a brake booster that is able to be regulated.

In certain braking situations or operating situations of a braking system it may be necessary to reduce or increase the supporting force applied by the brake booster. This may be done using the regulatable brake booster.

It is provided that the relationship between input force and applied supporting force is determined by the brake booster while using at least one information with regard to at least one elastic element. The deformation of the elastic element, in this case, is a function of both the input force and the supporting force.

The elastic element transmits the input force and the supporting force to the output rod. The input rod of the brake booster is connected to the brake pedal, and the output rod of the brake booster is able to act directly or indirectly on an input piston of the main brake cylinder. By such an elastic element one may, for instance, understand a spring or an elastic component such as is used in the brake booster as a reaction disk.

If data with respect to the elastic elements are taken into account in the determination of the supporting force to be applied, a reaction on the part of the braking system may be reduced, particularly the change in the force that acts against the driver at a given pedal position. In this way, the driver senses less reaction from the braking system and thus does not implement the change of the characteristic of the brake booster, or only to a slight extent.

It is also provided that the supporting force of the brake booster to be applied is determined while using at least one information with respect to a pressure-volume relationship of the hydraulic brake system. Such a pressure-volume relationship may be a p-V characteristics curve, for example.

In an advantageous manner, the characteristic of the brake booster is able to be changed or varied by data with respect to the elastic element on the part of the brake booster as well as by taking into account of data with respect to the pressure-volume relationship of the connected hydraulic elements. Consequently, essential components of the braking system, of the brake boosters and the hydraulic elements that are present in the braking system are taken into account for setting the characteristic.

Furthermore, it is provided in the method according to the present invention, that the supporting force is set in such a way that an infinitesimally small change in the supporting force leads to a vanishing displacement of the input element of the brake booster, particularly to a displacement of zero. In this context, one must assume that the actuation by the driver is held constant. By a constant actuation by the driver, one should understand, for example, a constant input force and/or a constant input path.

If one changes the supporting force at a given brake actuation by the driver, that is, if one changes the characteristic of the brake booster, this may be perceived by the driver, particularly if the characteristic is changed during a braking process. The change in the characteristic, for example, leads to the force applied by the driver for achieving the present pedal position changes. This is perceived, as a rule, as a change in the counterforce. On the other hand, if the driver should impress a constant input force, the change of the characteristic leads to a displacement of the input rod, and thus of the pedal position. An offset of the input element at constant input force, or a changed input force to be applied by the driver at constant position of the pedal or of the input force, is able to be summarized by the term "reaction" for the driver.

In the method according to the present invention, the supporting force is set so that such a reaction on the driver, e.g. at a present change in the supporting force and constant input force is minimized, for instance, in this context, a driver experiences a vanishingly small displacement of the input element, particularly no displacement of the input element.

Adapting the characteristic of the brake booster to a present braking situation is thus able to take place at reduced reaction on the driver, especially also completely without reaction.

A present braking situation may, for instance, be a change of a regenerative braking torque, which acts on the braking along with a hydraulic braking torque.

In a further embodiment of the method according to the present invention, it is provided that the supporting force is set in such a way that, upon a finite change in the supporting force, an additional force, which has to be applied in order to hold the input element at the same position, is minimal, particularly equal to zero.

If the supporting force changes in a present braking situation or an operating state of the entire braking system. that is, not as up to now, by an infinitesimal proportion, but now by a finite proportion, then an additional force is required to hold the input element at the same position. By setting the supporting force it is ensured that the change in the force to be applied by the driver, which is required to hold the input element at the same position in response to the finite change in the supporting force, is as small as possible. Thus, a reaction to the change in the supporting force, that is irritating to the driver, may advantageously be avoided.

In a further embodiment of the method according to the present invention, it is provided that the additional force to be applied is applied by an actuator. In this way, the driver does not have to vary the input force, but the actuator does. The actuator, in this instance, may additionally be provided as an actuator in the brake booster.

In a further embodiment of the method according to the present invention, it may be provided that the additional force to be applied is applied by a reaction force, especially a static frictional force. In this way, it is ensured that the minimal change in the input force, which is required to hold the input element at a fixed position when the supporting force of the brake booster is changed is not to be applied by the driver. In this way, the driver advantageously does not experience any negative reaction on the part of the braking system.

In a further embodiment of the method according to the present invention, it is provided that the minimal change of the input force is applied by a frictional force, the force being regulated. The regulated frictional force is particularly a sliding frictional force which is regulated mechanically and/or electrically, especially by a brake.

In a further embodiment of the method according to the present invention, it is provided that the brake is a frictional brake, which acts directly or indirectly on the input element. Thus it may be provided, for example, that the brake presses the input element against an additional surface to generate the frictional force. In this way, in an advantageous manner, by a skillful selection of the surface, according to the present invention, against which the input element is pressed, the frictional force may be set, for example, with respect to the order of magnitude of the frictional force.

In a further embodiment of the method according to the present invention, it is provided that the brake booster is a part of an hydraulic partial braking system of an overall braking system. In the method according to the present invention, an hydraulic braking torque is set by a change in the supporting force of the brake booster. A braking torque difference between an overall braking torque and a regenerative braking torque is reduced using an hydraulic braking torque. It is provided, in particular, to compensate for this braking torque difference. The regenerative braking torque is produced, for example, by a generator which charges the energy source. Such regenerative braking systems are used in electric or hybrid vehicles.

The regenerative braking torque is produced by an additional partial braking system of the overall braking system. If, as described, the hydraulic braking torque is adjusted to the present regenerative braking torque by changing the supporting force, the overall braking effect may be held constant thereby, in an advantageous manner, at a given driver actuation. In this way, the overall braking effect of the vehicle is independent of the present operating situation, especially of the regenerative braking system, whose braking effect depends greatly on the present vehicle speed as well as, for instance, the state of charge of the energy store, which is charged using the regenerative braking system. By operating the brake booster according to the relationship, according to the present invention, between the input force and the supporting force, the braking effect of the vehicle is able to be held constant, in this way, by taking into account the braking effect of the regenerative system, which is changeable, a negative reaction on the driver by operating the brake booster according to the relationship of the present invention being prevented.

In a further embodiment of the method according to the present invention, it is provided that the supporting force to be applied as a function of the input force is stored in the vehicle as a characteristics curve. The stored characteristics curve, in this context, is a function of at least one information with respect to the at least one elastic element as well as of the at least one information with respect to a pressure-volume relationship of the hydraulic braking system. The characteristics curve is not necessarily a function of the input force. Since the input force, on which the supporting force to be set is based, is also able to be determined with the aid of a signal of a displacement sensor which measures the input path of an actuating element, it may also be provided that the characteristics curve links the supporting force to the input path, instead of to the input force.

In a further embodiment of the method according to the present invention, it is provided that the characteristics curve is recalibrated, particularly in response to maintenance intervals in a workshop or within the scope of checking before or at the start of the vehicle. If the relationship is present in the vehicle as a characteristics curve, the latter is able to be recalibrated and, in an advantageous manner, the current relationship, which takes into account the state of the braking system, such as aging-related deviations of the state of the braking system, is always present.

It may also be provided that the supporting force, that is to be set, is calculated as a function of the input force during braking. During the calculation, too, the supporting force, that is to be set, is a function of at least one information with respect to the at least one elastic element (9) as well as of the at least one information with respect to a pressure-volume relationship of the hydraulic braking system.

In that case, providing a characteristics curve in the vehicle, especially in a control unit of the vehicle, is not necessary. If the supporting force is always calculated during a braking procedure, that is, during the operation of the vehicle, the supporting force set is always based on the value currently present in the vehicle. Consequently, a recalibration may advantageously be omitted. Either the at least one information with respect to the pressure-volume relationship or the at least one information with respect to the elastic element, or both, must be determined, in this instance, from measured variables, are known, in this instance, and stored in the vehicle in electronic form. Both data may be stored in the control unit.

It may be provided that one should ascertain the input force using a force sensor or calculate it with the aid of at least one signal of a displacement sensor.

Moreover, the present invention includes a regulatable brake booster which applies its supporting force to an output element of the brake booster, the supplied supporting force of at least one information being a function of at least one information with respect to at least one elastic element, which is located between an input element of the brake booster and the output element, of at least one information regarding a pressure-volume relationship of the hydraulic braking system, particularly a p-V characteristics curve, as well as of an input force applied by the driver, which is applied to the input element.

The relationship between input force and supporting force may be determined, in this context, based on the two informations named in such a way that a reaction on the driver, in response to a change in the supporting force, is minimized. The brake booster applies the supporting force. Consequently, in an advantageous manner, operating the brake booster is possible, in which the brake booster makes available a supporting force which is able to be changed, without the driver experiencing a reaction. Thus, an irritating reaction for the driver, such as by the offsetting of the brake pedal at constant input force is able to be avoided. The possibility of adjusting the supporting force to present requirements of the braking system, especially the braking situation, is furthermore maintained.

In a further embodiment of the brake booster, it is provided that the brake booster applies the supporting force and an additional force, which has to be applied, in response to a finite change in the supporting force to the input element, in order to minimize/completely suppress the reaction, and counteracts an offset of the input element, especially holds the input element at the same position. It is particularly advantageous, in this context, that because of the brake booster, not only the supporting force is set, but also the additional force is able to be applied. In a further embodiment of the brake booster, it is provided that the brake booster have an additional actuator. Using this additional actuator, the additional force is able to be applied and changed. Because an additional actuator is provided in the brake booster, the supporting force may be changed in such a way that the reaction on the driver is minimized or completely suppressed in response to a variation of the supporting force. Consequently, the characteristic of the brake booster may be adjusted by the driver unnoticed. Because the actuator is a part of the brake booster, the hydraulic braking system is able to be designed in a more space-saving way, since no additional component has to be integrated into the vehicle.

In a further embodiment of the brake booster, it is provided that the brake booster have a mechanical and/or electromechanical brake. The brake, in this instance, is able to be operated mechanically and/or electromechanically. The brake acts upon the input element of the brake booster. A change in the additional force is made possible by operating the brake, electromechanically or mechanically. Because of a mechanically operable brake, the additional force may be varied as a function of the operating position of the input element and/or the position of the boosting element. The mechanically operable brake may occur, for instance, in the form of a mechanical coupling, particularly in the form of an elastic mechanical coupling of the boosting element and the brake pedal or input element. An electromechanically operable brake includes an additional actuator. The change in the input force takes place by friction, in this case. Both static friction and sliding friction are conceivable. An electromechanically operable brake has the advantage that the amount, by which the input force is changed, is able to be finely regulated and set.

Besides the method for operating the brake booster, as well as the brake booster itself, a part of the present invention is a control unit for carrying out the method as well as for operating the brake booster itself. The brake booster is able to be actuated using the control unit. Controlling, in this connection, may also be understood to mean regulation. Using the control unit, the supporting force that is to be set may be ascertained, for one thing, from characteristics curves or may also be calculated directly, with or without using characteristics curves. Furthermore, the setting of the supporting force and, if necessary, of the additional force of the brake booster is controlled by the control unit. In particular, it may be provided that the control unit control the additional actuator of the brake booster for operating the brake. In addition, the additional actuator, which applies an additional force onto the input element, is operated using the control unit.

BRIEF DESCRIPTION OF THE DRAWINGS

FIG. 1 shows schematically the controllable brake booster.

FIG. 2 shows a substitute model of the brake booster, which represents the cooperation of the forces, of the brake booster and the driver, applied or resulting during braking.

DETAILED DESCRIPTION

Figure 3A:
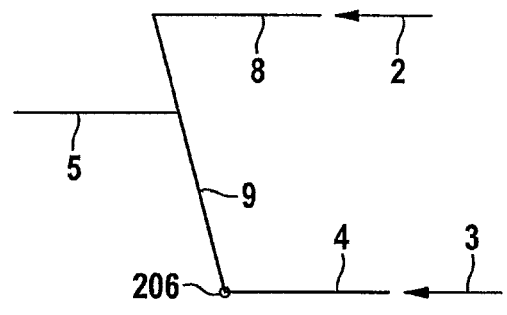
FIGS. 3a and 3b show, with the aid of the substitute model, what effects a regenerative braking process is able to have on the brake booster and the driver.

The exemplary embodiments and/or exemplary methods of the present invention relate to a brake booster 1, as shown schematically in FIG. 1.

Brake booster 1 is intended to be understood, in the following, as a controllable and/or regulatable brake booster 1, and is designated below only as brake booster 1. Controllable/regulatable includes, in particular, that supporting force 2 of the brake booster is able to be varied for operating a main brake cylinder (not shown). Thus, brake booster 1 is able to apply a supporting force $F_{sup\_2}$ depending on the driver, for instance, as a function of an input force 3, which, as a rule, is equivalent to the operating force $F_{in\_3}$ of the driver. Input force 3 may, if necessary, include a further, additional force besides the operating force of the driver, which will be explained below in the description of the method.

Input force 3 acts upon input element 4. In the same way, the brake booster is able to apply supporting force $F_{sup\_2}$ as a function of an operating path/operating position of input element 4.

In the same way, brake booster 1 is also able to provide a supporting force 2 independently of the actuation of a brake pedal by the driver, particularly independently of the operating force of the driver and/or the actuating travel of the brake pedal.

Input force 3 and supporting force 2 act together on an output element 5. The output element is the able to act upon, for example, an input piston of a main brake cylinder at an output force 6, and thus initiate braking the vehicle. Supporting force 2 of the brake booster is applied by an actuator 7, a motor, for example. This may take place via a transmission, for instance, a rotation-translation transmission. The supporting force then perhaps acts via the transmission, on a reinforcement element 8. Input force 3 and supporting force 2 are transmitted to output element 5 via a coupling element 9, which combines the forces to form output force 6. In this context, the coupling element may be designed differently.

It is believed to be important to the exemplary embodiments and/or exemplary methods of the present invention that the deformation of the coupling element may depend both on the input force and the supporting force, that is, for instance, designed in the form of a force balance, which indicates a deviation of the ratio of supporting force 2 to input force 3 from a specified ratio by a deformation. Such a force balance is a reaction disk, for example, as may frequently be found in brake boosters, and which we shall assume in the following without restriction of generality. Reaction disk 9 may be directly connected to output element 5, or indirectly via additional components. Input element 4 and reinforcement element 8 do not have to be in direct connection to the reaction disk. The brake booster may have free travel between an input element and reaction disk 9, which first has to be overcome before input element 4 comes into contact with reaction disk 9.

With the aid of a substitute model, FIG. 2 shows the variables required for operating the brake booster. The same elements are characterized in FIG. 2 by the same reference numerals as in FIG. 1. The actuator of brake booster 1 (not drawn in FIG. 2) is able to apply a supporting force 2 to booster element 8, which leads to an adjustment path $s_{sup}$ 201 of the booster element. If the driver applies an input force $F_{in}$ 3 to input element 4, it is displaced by a path $s_{in}$ 202. Input force 3 and supporting force 2 are combined to form an output force $F_{out}$ 6 via coupling element 9. Output element 5 is displaced in the process by a path of $s_{out}$ 203. The substitute model of the brake booster further includes variables representing reaction disk 9. Thus, reaction disk 9 has an elasticity 204. In addition, in FIG. 2, three contact points 205, 206 and 297 may be recognized. A quotient x gives the ratio of path x between points 205 and 207 and the path between points 206 and 207 (characterized in this case by length one). The lever lengths, that is, the length of the distance of points 205,207 and points 206,207 correspond to areas on reaction disk 9. The solid line shows reaction disk 9 in the position at rest. If there is a supporting force 2 and/or an input force 3 present, this may lead to a deformation of reaction disk 9, shown as a dot-dashed line 208 in FIG. 2. This deformation of reaction disk 9 leads to a differential path ds 210 between the new position of point 206 in response to applied input force and/or supporting force and point 207.

As was described above, the method according to the present invention is used, among other things, if the proportion of the braking effect of a regenerative partial braking system of the overall braking system changes.

For the sake of simplicity, it shall be assumed only that the driver is braking using constant input force, only during participation of the hydraulic partial braking system. In this context, the brake booster is able to apply a supporting force 2. This initial situation is shown in FIG. 3*a*. Here, too, the reference numerals of FIGS. 1 and 2 are maintained, provided the designated elements in FIG. 3 correspond to the elements in FIGS. 1 and 2, respectively. If the driver applies the brake at constant input force, point 206 is located at a position shown in FIG. 3*a*. By applying the input force and the supporting force, a deformation of reaction disk 9 is present.

Furthermore, it is now assumed that an additional braking effect is added by the regenerative partial braking system. Since the overall braking effect is to be held constant, the supporting force is reduced. In the partial braking system, this leads to a reduction in the pressure in the wheel brakes, and thus to a reduction in the hydraulic braking effect.

Additional effects of a main brake cylinder and a possibly present hydraulic assembly (such as ESP or ABS), are ignored here for simplicity's sake.

Figure 3B:
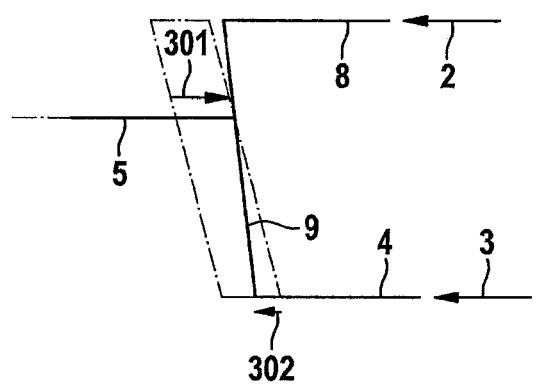

Since the pressure in the hydraulic partial braking system was reduced by a reduction in supporting force 2, brake fluid flows back into the main brake cylinder. This leads to an offset of output element 5 in the opposite direction from the original actuation. This is shown in FIG. 3*b*. The dot-dashed line shows the initial situation of FIG. 3*a* as well as a parallel offset of it by path $ds_{out}$ 301. Furthermore, an additional deformation of reaction disk 9 takes place, which results in a deflection at the contact point of input rod $delta_s$ 302. This is about a position change relative to the position change of the output element. The elasticity of reaction disk 9 may either have a linear dependence between force and deformation path or generally a characteristics curve that describes this relationship. For the linear case, delta shows the relationship:

$$delta_s = 1/c \ (F_{in} - x \ F_{sup})$$

In the case of a characteristics curve $P(F_{in} - x \ F_{sup})$, $delta_s$ shows the relationship: $delta_s = P(F_{in} - x \ F_{sup})$.

The offset of input element $ds_{in}$ brought about by the change in supporting force 2 follows from $$s_{in} = s_{out} + delta_s.$$

In order to investigate the offset based on the change in the supporting force, the variation in the quantity $s_{in}$ may be regarded under the assumption a constant input force. From this, it follows that:

$$ds_{in}|_{Fin=konst.} = \frac{\partial s_{out}}{\partial F_{out}} \frac{\partial F_{out}}{\partial F_{sup}} \Delta F_{sup} + \frac{\partial delta_s}{\partial F_{sup}} \Delta F_{sup}$$

$$= \frac{\partial s_{out}}{\partial F_{out}} \Delta F_{sup} + \frac{\partial delta_s}{\partial F_{sup}} \Delta F_{sup}$$

where sometimes the partial derivatives of the output force $F_{out}$ and/or of the supporting force $F_{sup}$ are formed and used. The term $s_{out}$ ($F_{out}=F_{in}+F_{sup}$) represents the volume take-up of the braking system, depending on the driver force and the supporting force. This relationship is usually non-linear.

In order to achieve that the driver notices as little as possible of the change in the supporting force and thus offset $s_{in}$, variable $ds_{in}$ has to become as little as possible at constant input force $F_{in}$, and equal to zero in the optimum case. It may also be provided that the change of force is to be minimal in order to hold variable $ds_{in}$ steady.

Using the condition $ds_{in}=0$, the above equation yields:

$$\frac{\partial s_{out}}{\partial F_{out}} \Delta F_{sup} + \frac{\partial delta_s}{\partial F_{sup}} \Delta F_{sup} = 0$$

But from this, there follows that:

$$-\frac{\partial P}{\partial F_{sup}} = \frac{\partial s_{out}}{\partial F_{out}}$$

Substituting into this equation again all the dependencies, this yields $$-\frac{\partial P(F_{in} - xF_{sup})}{\partial F_{sup}} = \frac{\partial s_{out}(F_{in} + F_{sup})}{\partial F_{out}} \quad (1)$$

The term on the left is a function of the characteristics curve of reaction disk 9. The term on the right of the equation describes, in turn, the volume take-up of the braking system. Both the characteristics curve of the reaction disk and the volume take-up of the braking system are variables which are known, as a rule, or may otherwise be determined directly or indirectly. If these variables are present particularly in the form of characteristics curves, then from a given relationship (1) for each driver input force $F_{in}$, an associated supporting force $F_{sup}$ is able to be given, in the case of each of the value pairs $F_{in}$ and $F_{sup}$ thus found, the condition that $ds_{in}=0$ applies, is satisfied.

In this way, an optimized booster characteristics curve is able to be ascertained, using which each input force $F_{in}$ is able to be associated with a supporting force $F_{sup}$. This method works on the assumption that the characteristics curve of reaction disk 9 and the volume up-take of the brake system are not too far apart, so that the above condition is able to be attained within a meaningful scope. The booster characteristics curve thus ascertained may now be used in different ways to control the brake booster.

For one thing, the booster characteristics curve may be calculated ahead of time, using the given relationship (equation 1). This booster characteristics curve is then used unchanged, if necessary, including a brake contribution of a regenerative partial braking system.

In a further embodiment, the booster characteristics curve is recalibrated. This recalibration may take place for a given reason or also regularly, for instance, at each restart of the vehicle or in response to maintenance. In this way it is possible to take into account wear in the braking system, for instance, at brake linings or aging effects in the braking system at the determination of the booster characteristics curve. Thus there is always a booster characteristics curve present, which is adjusted to the state of the vehicle. It is also conceivable, at the recalibration, to include in the consideration, directly or indirectly, environmental conditions, such as an outside temperature, for example, in the determination of the characteristics curve.

For another thing, it is conceivable to regulate supporting force $F_{sup}$ 2 during a braking process, with the aid of a regulation according to equation 1, at all times during a braking at which there is not yet present an amount of a braking effect of a regenerative braking system. For this purpose, the supporting force and the driver force are able to be calculated via a sensor system present in the brake booster and/or via control/regulating variables of the brake booster. For this calculation, variables may be used such as signals of a displacement sensor of input rod 4, of a position sensor of booster element 8, of a motor position sensor of motor 7 and an admission pressure sensor of the hydraulic brake system. In the same way, input force $F_{in}$ may be measured directly, using a force sensor. It is also possible to determine the deformation of reaction disk 9. The sensor system mentioned is not drawn in the figures.

Consequently, during an operation of the brake, the variables $$-\frac{\partial P(F_{in} - xF_{sup})}{\partial F_{sup}} \text{ and } \frac{\partial s_{out}(F_{in} + F_{sup})}{\partial F_{out}}$$

may also be calculated during braking.

While using these calculated variables, equation (1) may now be drawn upon for regulating the brake booster, that is, for setting the supporting force.

In the abovementioned possibilities of operating the brake booster with the aid of a characteristics curve, that is, calculated ahead of time, or in a regulation, using direct calculation of the supporting force to be set, it still applies then that one may set the supporting force according to the relationship in equation (1).

This may, in turn, take place with the aid of signals of a displacement sensor of input rod 4, a position sensor of booster element 8, a motor position sensor of motor 7 and/or a differential displacement sensor. The sensor system mentioned is not drawn in the figures.

Independently of whether the brake booster is calculated with the aid of a characteristics curve, that is, calculated ahead of time, or is operated during a regulation using direct calculation of the supporting force to be set, input force $F_{in}$, from which the determination of supporting force $F_{sup}$ starts, is either able to be measured directly or be calculated from additional variables, for instance, from signals of a displacement sensor of input rod 4. Thus, characteristics curve $F_{in}$-$F_{sup}$ does not have to be present in this form, but a characteristics curve $s_{in}$-$F_{sup}$ may be provided or the calculation of the supporting force may be made starting from an input path $s_{in}$.

The supporting force is now set in such a way that, not as originally, a differential path of zero is set between booster element 8 and input rod 4, but so that equation 1 is satisfied.

This, in turn, may be set with the aid of a differential path, such as by using the differential path sensor just mentioned, in that the differential path corresponding to the newly calculated characteristic $F_{in}-F_{sup}$ is regulated in.

Figure 4:
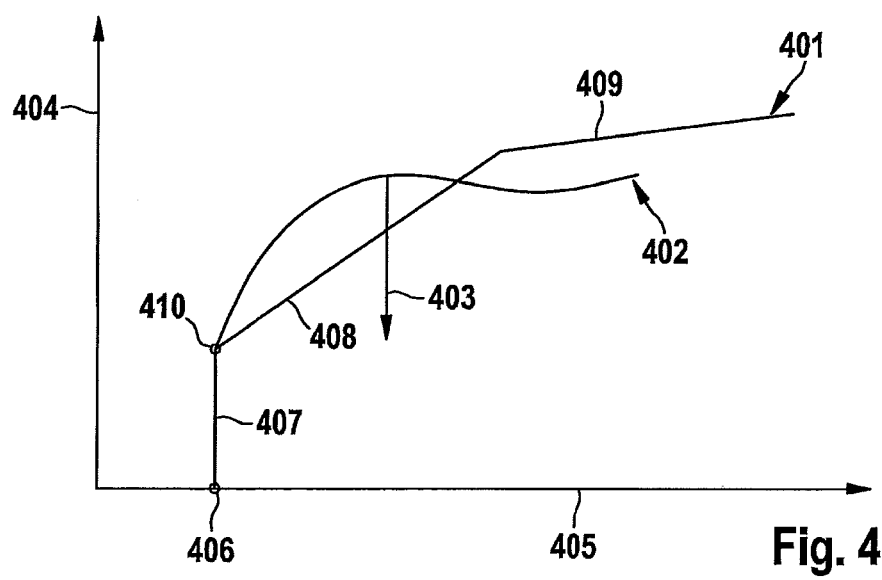
FIG. 4 shows a curve of a characteristic of the brake booster as well as, in exemplary form, an optimized characteristic according to the method according to the present invention.

FIG. 4 shows two different booster characteristics curves. On vertical axis 404 output force $F_{out}$ 6 is plotted, that is, the sum of operating force $F_{in}$ 3 and supporting force $F_{sup}$ 2. On horizontal axis 405, input force $F_{in}$ 3 is plotted. The course of characteristics curve 401 is the course of a usual brake booster. The output force first rises as of a certain input force, in FIG. 4, at a point 406. There follows a range of the characteristics curve in that output force $F_{out}$ 6 increases at constant operating force $F_{in}$ 3, followed by a range 408, which shows a linear relationship between output force $F_{out}$ 6 and operating force $F_{in}$ 3. In a range 409 of the characteristics curve, the brake booster is already in an operating mode that is also designated as a run out. In this instance, the brake booster is no longer able to apply the specified boost, or at least not more completely.

In comparison to the course of characteristics curve 401 of a usual brake booster, the optimized booster characteristics curve, based on equation 1, is able to have a course, for example, as is shown by curve 402 in FIG. 4. The characteristics, such as maxima, minima, rises and/or inflection points in the curve are, in this case, are not to be understood as restriction, but are used only as illustration. The curve shown is supposed to represent that the optimized booster characteristics curve differs from the usual characteristics curve, according to which the brake booster is otherwise operated. The course of the curve may be completely different for different vehicles each having different constructive design and components used. It is, however, characteristic that the curve only begins to deviate from the usual curve as soon as input force $F_{in}$ 3 has exceeded point 406.

As soon as point 406 has been exceeded with respect to the input force, the method comes into use. Arrow 403 in FIG. 4 indicates what happens upon the switching in of a further braking effect at constant operating force $F_{in}$ 3. Supporting force $F_{sup}$ 2 is reduced, in order to hold the entire braking effect constant.

If one operates the brake booster using an optimized booster characteristics curve according to equation 1, this leads to a situation in which, at infinitesimally small changes of supporting force $F_{sup}$, the change in the input path $s_{in}$ is equal to zero.

At changes in supporting force $F_{sup}$ of a finite magnitude, the operating of the brake booster, using the optimized characteristics curve, however, leads again to an offset of input element 4, that is, to a change in $s_{in}$ 202. The optimized booster characteristics curve is left, in this instance, as is indicated by arrow 403. This means that a complete compensation for the offset of input element 4 is also not possible by using an optimized booster characteristics curve.

In order for the driver not to feel any offset of the input element, he could change input force 3 by a certain amount. Thus, it would be possible, in spite of changed supporting force 2 of the brake booster, to maintain the operating position of input element $s_{in}$. He would notice, however, this change in input force 3.

The use of a booster characteristics curve according to equation (1), when switching in a regenerative braking effect, reduces the force additionally to be applied by the driver, in order to hold input element 4 at a reduction in supporting force $F_{sup}$ at a fixed operating position $s_{in}$. In particular, the force to be applied in addition by the driver is minimized.

In a further embodiment of the present invention, the required change in the input force 3, lowered by the method described above, which is necessary to hold input element 4 at a fixed operating position $s_{in}$, is applied by an additional force. In this context, it is especially provided that, through this additional force, operating position $s_{in}$ is able to, and will be held constant at an operating force $F_{in}$ that is remaining constant. In the following, it has to be considered that input force 3 is not necessarily applied only by the driver but may include an additional force besides the proportion originating with the driver.

Analogous to the abovementioned derivations, elasticity $\epsilon$ of the hydraulic brake system is able to be written as a function of output force $F_{out}$ as follows:

$$\varepsilon(F_{out} = F_{in} + F_{sup}) = \frac{\partial s_{out}}{\partial F_{out}}.$$

If one also forms the variation of operating position 202, analogously to the method described above, this yields, for the case of a linearly elastic reaction disk:

$$ds_{in} = \frac{\partial s_{out}}{\partial F_{out}}\left(\frac{\partial F_{out}}{\partial F_{sup}}\Delta F_{sup} + \frac{\partial F_{out}}{\partial F_{in}}\Delta F_{in}\right) + \qquad (2)$$

$$\frac{\partial delta_s}{\partial F_{sup}}\Delta F_{sup} + \frac{\partial delta_s}{\partial F_{in}}\Delta F_{in}$$

$$= \varepsilon \cdot (\Delta F_{sup} + \Delta F_{in}) - \frac{x}{c}\Delta F_{sup} + \frac{1}{c}\Delta F_{in}$$

$$= \left(\varepsilon - \frac{x}{c}\right) \cdot \Delta F_{sup} + \left(\varepsilon + \frac{1}{c}\right)\Delta F_{in}$$

In this instance, $\Delta F_{sup}$ and $\Delta F_{in}$ are changes in supporting force 2, $\epsilon$ corresponds to the value of elasticity 204 of reaction disk 9 with respect to input force/input path. With the aid of this equation it may be seen what effect a change in supporting force 2 and input force 3 has on operating position 202.

Moreover, let us assume that the elasticity of reaction disk 9 is already adjusted in such a way that it already compensates for a certain part of the offset of input element 4, which occurs in response to a reduction of the supporting force at constant input force, or rather, would occur. This corresponds to the situation as is described above in equation 1 of the first embodiment of the method according to the present invention. This can also be expressed as follows:

$$\varepsilon \Delta F_{sup} - \frac{x}{c}\Delta F_{sup} << \varepsilon \Delta F_{sup}$$

$$\varepsilon - \frac{x}{c} << \varepsilon$$

With the aid of this equation and together with equation 2, one is able to recognize the following: the proportion of the path which is based on the flowing back of the brake fluid from the braking system ($\epsilon \Delta F_{sup}$) is clearly reduced by the deformation of the reaction disk, based on the reduction of supporting force $$\left(-\frac{x}{c}\Delta F_{sup}\right).$$

Since, however, as was described above, this is not completely the case, a small residual path $\Delta s_{in}$ remains which still has to be compensated for, or which still has to be reduced.

It is only able to be blended by a change in the input, that is, via term $$"\left(\varepsilon + \frac{1}{c}\right)\Delta F_{in}".$$

By contrast to the first embodiment of the method according to the present invention, $F_{in}$ includes not only the operating force applied by the driver, designated below as $F_F$, but in addition, a force which is designated as $F_r$ below.

In the embodiment, described first, of the method according to the present invention, the change in the input force $\Delta F_{in}$ was assumed to be zero, since the driver has applied a constant operating force $F_F$ as the only contribution to input force $F_{in}$ 3. In the following, we shall continue to assume a constant driver force.

Additional force $F_r$ may change, however. Since a constant operating force means $\Delta F_F=0$, the change in input force 3 in equation (2) may be written as follows:

$$\Delta F_{in}=\Delta F_F+\Delta F_r=\Delta F_r$$

By substituting in equation (2) it becomes clear that by applying an additional force $\Delta F_r$, an additional path of $$\Delta s_{in} = \left(\varepsilon + \frac{1}{c}\right)\Delta F_r$$

is able to be compensated for.

In order also still to compensate the remaining path which was not yet able to be compensated via reaction disk 9, this additional force $\Delta F_r$ has to be applied.

Now, the additional force $\Delta F_r$ is able to be applied in various ways.

Figure 5:
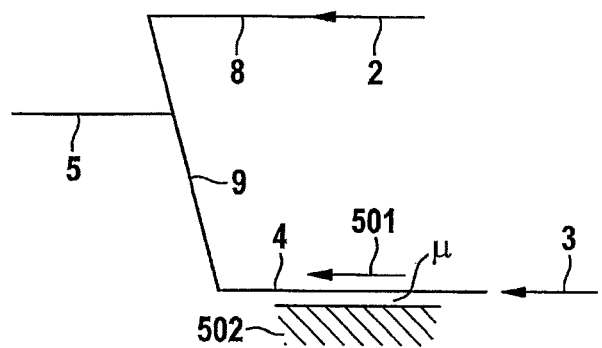
FIG. 5 shows, with the aid of the substitute model, how an additional force may be applied via static friction to the operating element of the braking system.

In a first embodiment, additional force 501 $F_r$ may be a passively applied force. A static friction force may be understood by this, for example. This situation is shown in FIG. 5. If supporting force $F_{sup}$ changes, one may expect an offset of input element 4. If it adheres to an additional surface 502, a change is created in additional force $\Delta F_r$, in this case the frictional force, since the frictional force is a reaction force. The friction between surface 502 and input element 4 is shown in FIG. 5 by reference symbol μ. However, this method functions only if the driver, during the braking process having regenerative and a hydraulic braking system does not change the pressure, or does not specify any change request.

Alternatively or in addition, frictional force 501 may also be controlled or regulated. Thus, a brake may be provided, for instance, at input element 4, which is provided with an actuator. This actuator may be designed to be very small. The frictional force may, for instance be regulated and/or controlled as control variables while using the operating path of a piston of the main brake cylinder (not shown) and the deviation of the supporting force from the associated value without regenerative braking (i.e. deviation from the static equilibrium)

Figure 6:
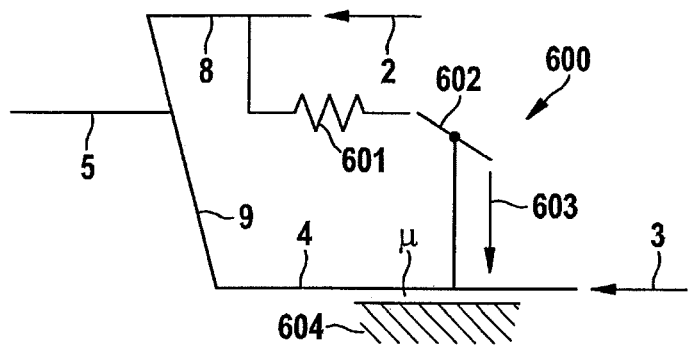
FIG. 6 shows, with the aid of the substitute model, how an additional force may be applied via friction of a brake to the operating element of the braking system.

An automatic mechanical regulation 600 of the additional force on the input element is possible, for example. This is shown in FIG. 6, on the substitute model of the brake booster. An elastic element 601 is connected structurally to booster element 8. In addition, elastic element 601 may come into contact with a lever arm which is rotatable and/or tiltably supported on a mounting support. The mounting support is structurally connected to input rod 4. If booster element 8 moves in relation to input rod 4, the position of elastic element 601 also moves with respect to lever arm 602. The lever arm is designed so that it is able to exert a force 603 on input rod 4. Input element 4 is pressed against a surface 604 via this force, and thus leads to a static and/or a dynamic friction, symbolized in FIG. 6 by reference symbol μ. Because of the direction in which booster element 8 is moving with respect to input element 4, in response to increase and/or decrease of supporting force $F_{sup}$, the amount of force 603 is able to vary. In this way, the additional force, i.e. the frictional force, may also be set. The setting described here of the frictional force is based on a frictional force which is a function of a differential path of booster element 8 and of input element 4. Because of the design, positioning, dimensioning and support of lever arm 602, surface 604 and/or of elastic element 601, the manner in which the frictional force changes with the differential path is able to be specified.

It should be noted that the mechanical regulation explained of the additional force is able to be used both during increase and decrease of the supporting force, that is, when switching in a regenerative braking system same as when switching off a regenerative braking system.

Alternatively, the reduction of a present frictional force is also possible. This possibility comes about, for example, when an above-described brake has already been operated. In the case of fixed input elements, the static frictional force may be used, since it represents a reactional force. If, however, the driver should still model the pressure, this is no longer possible. Now, instead of providing the additional force via the static friction force, as described above in the case of the passive variant, at this point, an oppositely directed dynamic frictional force is reduced. This works, because the sliding frictional force is always set counter to the motion. This reduction of the sliding frictional force may take place using a control or a regulation of a brake, as has been explained, or even purely mechanically as shown in FIG. 6. For this, the effects of the brake, which exerts the sliding frictional force on input element 4, has to be reduced.

Figure 7:
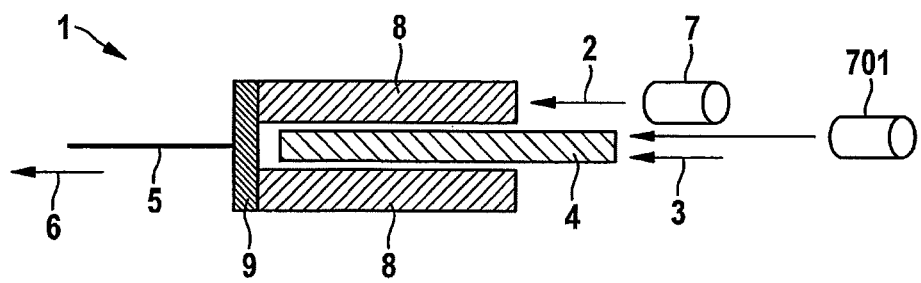
FIG. 7 shows an additional possibility of applying an additional force onto the operating element.

Alternatively or in addition, additional force $F_r$ may also be applied using an additional actuator 701, which transmits the additional force to input element 4. This is depicted schematically in FIG. 7. One possible embodiment of such an actuator is an electric motor, which acts with the additional force upon input element 4 via a transmission step.

The use of a frictional force as an additional force may lead during a braking operation to a hysteresis, that is to a different way of behavior of the brake force booster at a force increase in comparison to a force decrease at input rod 4 by the driver, with a view to the resulting output force $F_{out}$. However, since this behavior also occurs in usual brake boosters, it is known to the driver and may even be perceived as advantageous.

The method components described, that is, using an optimized booster characteristics curve and applying or regulating/controlling the additional force in regenerative brakes for path compensation must not be regarded as being insulated from one another. It is also conceivable and possible, and even advantageous to operate the two embodiments one behind the other or in parallel. If the brake booster is operated at nonregenerative brakes, with the aid of an optimized booster characteristics curve, one will reduce the offset of the input element upon switching in a generator torque, and reduces the additional applicable force, which is needed so as to hold the input element at an operating position. In order to hide completely the regenerative braking system, the additional force may subsequently be applied, if necessary, in at least one of the ways described It is also conceivable that one may operate the booster in response to nonregenerative brakes, that is, in the case of purely hydraulic brakes according to a usual characteristics curve, for example, characteristics curve 401 in FIG. 4, and then upon switching in the regenerative brake system, change the characteristics curve in direction of the optimized characteristics curve. The transmission could, however, be noticed by the driver, in this instance.

Generally it remains to be noted that the methods and applications described here were only described during the switching in of a regenerative partial braking system, but are in no way restricted to this. In the same way, switching off a regenerative partial braking system is possible, or even a change in the respective proportions of the hydraulic as well as the regenerative partial braking system in the overall braking effect.

What is claimed is:

1. A method for operating a regulatable brake booster of a hydraulic braking system, the method comprising:
   applying, using the brake booster, a supporting force to an output element of the brake booster to achieve a desired output force for a given input force applied to an input element; and
   when the desired output force changes for the given input force from a first output force to a second output force, deriving a revised supporting force to be applied as a function of (i) a first piece of information describing an elasticity of at least one elastic element, which is located between the input element of the brake booster and the output element, (ii) a second piece of information regarding a pressure-volume characteristics curve of the hydraulic braking system, and (iii) the given input force applied by the driver, which is applied to the input element, wherein the revised supporting force is derived so that a response of the input element to the driver's input force remains unchanged when the applied supporting force is set to the revised supporting force; and
   setting the applied supporting force to the revised supporting force.

2. The method of claim 1, wherein the revised supporting force is derived so that the change from the supporting force to the revised supporting force produces little or no displacement of the input element of the brake booster when the desired output force changes.

3. The method of claim 1, wherein the braking system applies an additional force to the input element, and wherein the additional force counteracts an offset of the input element resulting from the change of the supporting force when the applied supporting force is set to the revised supporting force, so that the input element is held at the same position.

4. The method of claim 3, wherein the additional force is applied by an actuator.

5. The method of claim 3, wherein the additional force is a frictional force.

6. The method of claim 4, wherein the additional force is applied by a brake, as at least one of a mechanically and an electrically regulated frictional force.

7. The method of claim 6, wherein the brake is a frictional brake which acts directly or indirectly upon the input element.

8. The method of claim 1, wherein the brake booster is part of a hydraulic partial braking system of an overall braking system, and wherein the applied supporting force produces a hydraulic braking torque that compensates for a braking torque difference between an overall braking torque and a regenerative braking torque.

9. The method of claim 1, wherein the revised supporting force to be applied is derived using a second characteristics curve stored in the vehicle, and wherein the second characteristics curve is a function of the first and the second pieces of information.

10. The method of claim 9, further comprising:
    recalibrating the second characteristics curve in response to maintenance intervals or within the scope of checking before or at the start of the vehicle.

11. The method of claim 9, wherein the input force applied by the driver is ascertained using a force sensor or is calculated with the aid of at least one signal of a displacement sensor of the input element.

12. A regulatable brake booster, comprising:
    a brake booster arrangement that applies a supporting force to an output element of the brake booster to achieve a desired output force for a given input force applied to an input element;
    wherein the brake booster arrangement is configured to derive, when the desired output force changes for the given input force from a first output force to a second output force, a revised supporting force as a function of (i) a first piece of information describing an elasticity of at least one elastic element, which is located between the input element of the brake booster and the output element, (ii) a second piece of information regarding a pressure-volume characteristics curve of a hydraulic braking system including the brake booster arrangement, and (iii) the given input force applied by the driver, which is applied to the input element, and wherein the revised supporting force is derived so that a response of the input element to the driver's input force remains unchanged when the applied supporting force is set to the revised supporting force.

13. The brake booster of claim 12, wherein the brake booster is configured to apply the revised supporting force and an additional force, wherein the additional force is applied to the input element in response to the change from the supporting force to the revised supporting force, and wherein the applied additional force counteracts an offset of the input element resulting from the finite change from the supporting force to the revised supporting force such that the input element is held at the same position.

14. The brake booster of claim 13, wherein the brake booster includes an additional actuator, which is configured to apply the additional force.

15. The brake booster of claim 12, wherein the brake booster has a mechanical and/or an electromechanically operable brake, which is configured to act upon the input element of the brake booster, the additional force being applied by operating the brake.

16. A control unit for operating a brake booster of a hydraulic braking system, comprising:
    a control arrangement configured to derive a supporting force to be applied to achieve a desired output force for a given input force applied to an input element, and to control the brake booster for applying the supporting force;

wherein the control arrangement is configured to perform the following:
  applying, using the brake booster, the supporting force to an output element of the brake booster to achieve the desired output force for the given input force applied to the input element; and
  when the desired output force changes for the given input force from the first output force to the second output force, deriving a supporting force to be applied as a function of (i) a first piece of information describing an elasticity of at least one elastic element, which is located between the input element of the brake booster and the output element, (ii) a second piece of information regarding a pressure-volume characteristics curve of the hydraulic braking system, and (iii) the given input force applied by the driver, which is applied to the input element, wherein the revised supporting force is derived so that a response of the input element to the driver's input force remains unchanged when the revised supporting force is applied.

17. The method of claim 5, wherein the control arrangement is configured to derive an additional force to be applied by a brake to the input element, wherein the additional force is at least one of a mechanically and an electrically regulated frictional force.

18. The method of claim 1, wherein the input force applied by the driver is ascertained using a force sensor or is calculated with the aid of at least one signal of a displacement sensor of the input element.

19. The method of claim 13, wherein the brake booster has at least one of a mechanical operable brake and an electromechanically operable brake, which is configured to act upon the input element of the brake booster, the additional force being applied by operating the brake.

20. The method of claim 1, wherein the input force applied by the driver and the applied supporting force cause deformations at respective areas on the elastic element, and wherein the deformations displace the output element to produce a volume change in the braking system.

21. The method of claim 1, further comprising:
  deriving the revised supporting force as a function of a third piece of information describing a volume take-up of the hydraulic braking system for a given input force and supporting force.

22. The brake booster of claim 12, wherein the brake booster arrangement is configured to derive the revised supporting force as a function of a third piece of information describing a volume take-up of the hydraulic braking system for a given input force and supporting force.

23. The control unit of claim 16, wherein the control arrangement is configured to derive the revised supporting force as a function of a third piece of information describing a volume take-up of the hydraulic braking system for a given input force and supporting force.

* * * * *